US010793733B2

(12) United States Patent
Shah et al.

(10) Patent No.: US 10,793,733 B2
(45) Date of Patent: Oct. 6, 2020

(54) INK COMPOSITIONS FOR FABRICATING OBJECTS FROM REGOLITHS AND METHODS OF FORMING THE OBJECTS

(71) Applicant: Northwestern University, Evanston, IL (US)

(72) Inventors: Ramille N. Shah, Hinsdale, IL (US); Adam E. Jakus, Chicago, IL (US); Katie D. Koube, Los Angeles, CA (US); Shannon L. Taylor, Chicago, IL (US)

(73) Assignee: Northwestern University, Evanston, IL (US)

( * ) Notice: Subject to any disclaimer, the term of this patent is extended or adjusted under 35 U.S.C. 154(b) by 431 days.

(21) Appl. No.: 15/564,522

(22) PCT Filed: Apr. 7, 2016

(86) PCT No.: PCT/US2016/026342
§ 371 (c)(1),
(2) Date: Oct. 5, 2017

(87) PCT Pub. No.: WO2016/164523
PCT Pub. Date: Oct. 13, 2016

(65) Prior Publication Data
US 2018/0079922 A1    Mar. 22, 2018

Related U.S. Application Data

(60) Provisional application No. 62/143,951, filed on Apr. 7, 2015.

(51) Int. Cl.
*C09D 11/00* (2014.01)
*C09D 11/36* (2014.01)
(Continued)

(52) U.S. Cl.
CPC ............ *C09D 11/36* (2013.01); *B29C 64/165* (2017.08); *B33Y 10/00* (2014.12); *B33Y 70/00* (2014.12);
(Continued)

(58) Field of Classification Search
USPC .............................................. 106/31.41, 31.4
See application file for complete search history.

(56) References Cited

U.S. PATENT DOCUMENTS 5,518,680 A    5/1996  Cima et al.
6,582,651 B1   6/2003  Cochran, Jr. et al.
(Continued)

FOREIGN PATENT DOCUMENTS

EP      0393747      10/1990
WO      WO0069008    11/2000
(Continued)

OTHER PUBLICATIONS

Cesaretti et al., Building components for an outpost on the Lunar Soil by means of a novel 3D printing technology, Acta Astronautica 93 (2014) 430-450, as supplied by applicants (Year: 2014).*

(Continued)

*Primary Examiner* — James E Mcdonough
(74) *Attorney, Agent, or Firm* — Bell & Manninng, LLC

(57) ABSTRACT

Ink compositions for fabricating objects from planetary regoliths and objects fabricated from the ink compositions are provided. The objects include flexible, elastomeric objects and hard objects. Also provided are methods, including three-dimensional (3D) printing methods, for fabricating objects using the ink compositions. The ink compositions comprise a natural planetary regolith, such as an extraterrestrial regolith, a graded solvent system, and an elastomeric polymer binder.

20 Claims, 11 Drawing Sheets

(51) Int. Cl.

| | | |
|---|---|---|
| *B33Y 80/00* | (2015.01) | |
| *B33Y 70/00* | (2020.01) | |
| *B33Y 10/00* | (2015.01) | |
| *C09D 11/10* | (2014.01) | |
| *C22B 5/00* | (2006.01) | |
| *C21B 15/02* | (2006.01) | |
| *C09D 11/322* | (2014.01) | |
| *C04B 35/18* | (2006.01) | |
| *B29C 64/165* | (2017.01) | |
| *C01G 49/02* | (2006.01) | |
| *C04B 35/10* | (2006.01) | |
| *C04B 35/14* | (2006.01) | |
| *C09D 1/00* | (2006.01) | |
| *C09D 4/00* | (2006.01) | |
| *C09D 5/00* | (2006.01) | |
| *C09D 13/00* | (2006.01) | |
| *C09K 3/00* | (2006.01) | |

(52) U.S. Cl.
CPC .............. *B33Y 80/00* (2014.12); *C01G 49/02* (2013.01); *C04B 35/10* (2013.01); *C04B 35/14* (2013.01); *C04B 35/18* (2013.01); *C09D 11/10* (2013.01); *C09D 11/322* (2013.01); *C21B 15/02* (2013.01); *C22B 5/00* (2013.01); *C04B 2235/3272* (2013.01); *C04B 2235/40* (2013.01); *C04B 2235/405* (2013.01); *C04B 2235/6582* (2013.01)

(56) References Cited

U.S. PATENT DOCUMENTS

| | | | |
|---|---|---|---|
| 6,664,006 | B1 | 12/2003 | Munshi |
| 8,535,719 | B2 | 9/2013 | Badylak et al. |
| 8,691,276 | B2 | 4/2014 | Badylak et al. |
| 9,327,448 | B2 * | 5/2016 | Shah ............... B29C 64/106 |
| 2001/0008317 | A1 | 7/2001 | Gaylo et al. |
| 2002/0103538 | A1 | 8/2002 | Hughes et al. |
| 2003/0151156 | A1 | 8/2003 | Crumm et al. |
| 2003/0236513 | A1 | 12/2003 | Schwarz |
| 2004/0186139 | A1 | 9/2004 | Reddy et al. |
| 2005/0003189 | A1 | 1/2005 | Bredt et al. |
| 2008/0004359 | A1 | 1/2008 | Ma et al. |
| 2008/0145639 | A1 | 6/2008 | Sun et al. |
| 2008/0268019 | A1 | 10/2008 | Badylak et al. |
| 2009/0117087 | A1 | 5/2009 | Carroll et al. |
| 2009/0117435 | A1 | 5/2009 | Du et al. |
| 2009/0208466 | A1 | 8/2009 | Yoo et al. |
| 2010/0000441 | A1 | 1/2010 | Jang et al. |
| 2010/0096596 | A1 | 4/2010 | Lewis et al. |
| 2010/0267143 | A1 | 10/2010 | Park et al. |
| 2010/0279007 | A1 | 11/2010 | Briselden et al. |
| 2011/0064784 | A1 | 3/2011 | Mullens et al. |
| 2011/0196094 | A1 | 8/2011 | Hamad et al. |
| 2014/0023723 | A1 | 1/2014 | Leach et al. |
| 2014/0099556 | A1 | 4/2014 | Johnson et al. |
| 2014/0271961 | A1 | 9/2014 | Khoshnevis |
| 2014/0335144 | A1 | 11/2014 | Ward et al. |
| 2015/0035209 | A1 * | 2/2015 | Shah ............... B29C 64/106 264/638 |
| 2015/0037385 | A1 | 2/2015 | Shah et al. |
| 2015/0076732 | A1 | 3/2015 | Kemmer et al. |
| 2015/0125952 | A1 | 5/2015 | Kim et al. |
| 2015/0231302 | A1 | 8/2015 | Duvall et al. |
| 2015/0315449 | A1 | 11/2015 | Kim |
| 2016/0032062 | A1 | 2/2016 | Clauss et al. |
| 2017/0081534 | A1 | 3/2017 | Shah et al. |
| 2017/0209622 | A1 | 7/2017 | Shah et al. |

FOREIGN PATENT DOCUMENTS

| | | |
|---|---|---|
| WO | WO2013180662 | 12/2013 |
| WO | WO2014209994 | 12/2014 |
| WO | WO2014210584 | 12/2014 |
| WO | WO2015102746 | 7/2015 |

OTHER PUBLICATIONS

Kyriakidou et al., Dynamic Co-Seeding of Osteoblast and Endothelial Cells on 3D Polycaprolactone Scaffolds for Enhanced Bone Tissue Engineering, Journal of Bioactive and Compatible Polymers, vol. 23, May 2008, pp. 227-243.

Jakus et al., 3D-Bioplotted Elastic Bone Scaffolds for Tissue Engineering Applications, Poster Presentation, Oral Biology Centennial, University of Chicago, Jun. 19, 2013.

Jakus et al., Bioplotted Elastic Hydroxyapatite-Based Tissue Engineering Scaffolds, Oral Presentation, TMS Pacific Rim International Congress on Advanced Materials and Processing, Waikoloa, HA , Aug. 6, 2013.

Jakus et al., A Single Platform 3D-Printing Approach for Fabricating Tissue Engineering Bio-Scaffolds from Multiple Material Systems, Oral Presentation, Materials Science and Engineering 2013 Hilliard Symposium, Northwestern University, Evanston, May 16, 2013.

Michna et al., Concentrated hydroxyapatite inks for direct-write assembly of 3-D periodic scaffolds, Biomaterials, vol. 26, Apr. 21, 2005, pp. 5632-5639.

Shuai et al., Fabrication of porous polyvinyl alcohol scaffold for bone tissue engineering via selective laser sintering, Biofabrication, vol. 5, No. 015014, Feb. 6, 2013, pp. 1-8.

R. Shah, The Use of 3D Bioplotted Scaffolds and Ultrasonic Stimulation for Tissue Engineering, Oral Presentation, Oral Biology Centennial, University of Chicago, Jun. 19, 2013, slides 1-24.

Yeo et al., Preparation and Characterization of 3D Composite Scaffolds Based on Rapid-Prototyped PCL/βTCP Struts and Electrospun PCL Coated with Collagen and HA for Bone Regeneration, Chem. Mater., vol. 24, Jul. 5, 2011, pp. 903-913.

Jakus et al., Biochemically Active Bioplotted Elastic Hydroxyapatite-Based Tissue Engineering Scaffolds: Structural, Mechanical, and in vitro Evaluation, Abstract for Presentation at TMS Pacific Rim International Congress on Advanced Materials and Processing Waikoloa, HA, Aug. 7, 2013.

Jakus et al., 3D-Printed Hyperelastic Bone for Hard-Tissue Engineering Applications, Abstract for Presentation at Hilliard Symposium, Northwestern University, May 15, 2014.

Intl. Search Report & Written Opinion issued for Intl. Patent Appl. No. PCT/US2015/030972, dated Aug. 26, 2015, 15 pp.

Calvert et al., Solid freeform fabrication of organic-inorganic hybrid materials., Materials Science and Engineering: C 6.2, 1998, pp. 167-174.

Hong et al., Microstructure and Mechanical Properties of Reticulated Titanium Scrolls, Advanced Engineering Materials, vol. 13, No. 12, 2011, pp. 1122-1127.

Jakus et al., Bioplotted Ceramics and Metals: A Universal Technique for Fabricating Complex, Ordered, and Functional Scaffolds, The 8th Pacific Rim International Congress on Advanced Materials and Processing, Abstract, Aug. 1, 2013.

A. Thorel, Tape Casting Ceramics for high temperature Fuel Cell applications, Ceramic Materials, Wilfried Wunderlich (Ed.), ISBN: 978-953-307-145-9, InTech, Sep. 28, 2010, pp. 49-68.

Falcade et al., Fuel Cell: A Review and a New Approach About YSZ Solid Oxide Electrolyte Deposition Direct on LSM Porous Substrate by Spray Pyrolysis, New Advances in Fundamental Researches and Applications, Dr. Yan Shao (Ed.), ISBN: 978-953-51-0032-4, InTech, Mar. 7, 2012, pp. 139-160.

International Search Report and Written Opinion dated in PCT/US2015/055773, Jul. 25, 2016.

Das et al., Graphene-based polymer composites and their applications, Polymer-Plastics Technology and Engineering, Feb. 27, 2013, vol. 52, No. 4, pp. 319-331.

(56) References Cited

OTHER PUBLICATIONS

Leigh et al., A simple, low-cost conductive composite material for 3D printing of electronic sensors, PLOS ONE, Nov. 21, 2012, vol. 7, No. 11, e49365, internal pp. 1-6.
Guo et al., Properties of polylactide inks for solvent-cast printing of three-dimensional freeform microstructures, Langmuir, Jan. 11, 2014, vol. 30, No. 4, pp. 1142-1150.
Jakus et al., Three-dimensional printing of high-content grapheme scaffolds for electronic and biomedical applications, ACS NANO, Apr. 10, 2015, vol. 9, No. 4, pp. 4636-4648.
International Search Report and Written Opinion mailed in PCT/US2016/026342, dated Jul. 12, 2016.
Cesaretti et al., Building components for an outpost on the Lunar soil by means of a novel 3D printing technology, Acta Astronautica, vol. 93, Aug. 8, 2013, pp. 430-450.
Zhao et al., 3D-Printing on Mars: Trade-off Between In-situ Spare Parts Production on Mars and Spare Parts Supply From Earth, Jul. 2014.
Jaycox et al., 3-D Printing Lunar and Martian Dusts From Liquid 3D-Inks, Poster Presentation at ASM Chicago on Apr. 8, 2014.
Méndez-Ramos et al., Prospective use of the 3D printing technology for the microstructural engineering of Solid Oxide Fuel Cell components, Boletin de la Sociedad Espaöola de Cerámica y Vidrio, vol. 53, Sep. 2014, pp. 213-216.
Jakus et al., 3D Printed Solid Oxide Fuel Cells from High Particle Content Liquid Inks, MRS Fall 2014 Meeting, Dec. 3, 2014.
Ahn et al., Printed Origami Structures, Advanced Materials 22, May 25, 2010.
Farandos et al., 3D Printing of Functional Layers for Solid Oxide Fuel Cells and Electrolysers, ECS Conference on Electrochemical Energy Conversion & Storage with SOFC-XIV, Jul. 26, 2015, Glasgow, Scotland.
Sun et al., 3D Printing of Interdigitated Li-Ion Microbattery Architectures, Advanced Materials 25, Jun. 17, 2013, pp. 4539-4543.
S. Taylor, Lomiko Metals Announce 3D Printing Graphene Patent, Jan. 21, 2014.
Subramanian et al., Development of biomaterial scaffold for nerve tissue engineering: Biomaterial mediated neural regeneration, Journal of Biomedical Science, Nov. 25, 2009.
Ahn et al., Carbon-nanotube-interfaced glass fiber scaffold for regeneration of transected sciatic nerve, Acta Biomaterialia 13, Nov. 21, 2014, pp. 324-334.
International Search Report and Written Opinion mailed in PCT Application No. PCT/US2017/042522, dated Sep. 29, 2017.
Extended European search report mailed in European Application No. 15792640.3, dated Oct. 19, 2017.
International Search Report and Written Opinion mailed in PCT/US2017/062218, dated Feb. 9, 2018.
Balla et al., First Demonstration on Direct Laser Fabrication of Lunar Regolith Parts, 2010.
Wan et al., Novel Material for in Situ Construction on Mars: Experiments and Numerical Simulations, arXiv:1512.05461v2, Jan. 7, 2016.
Allen et al., Sintering Bricks on the Moon, Engineering, construction, and operations in space: proceedings of Space 94, 1994, pp. 1220-1229.
Jakus et al., "Bioplotted "Elastic" Hydroxyapatite-Based Tissue Engineering Scaffolds," Presentation at The Minerals, Metals & Materials Society (TMS) Pacific Rim International Conference on Advanced Materials and Processing, Aug. 6, 2013, pp. 1-24.
Jakus et al.; "Bioplotted Metals and Alloys: A Near Universal Technique for Fabricating Ordered Scaffolds", Presentation at The Minerals, Metals & Materials Society (TMS) Pacific Rim International Conference on Advanced Materials and Processing, Aug. 8, 2013, pp. 1-30.

* cited by examiner

INK COMPOSITIONS FOR FABRICATING OBJECTS FROM REGOLITHS AND METHODS OF FORMING THE OBJECTS

CROSS-REFERENCE TO RELATED APPLICATIONS

The present application is a National Stage Entry of International Application No. PCT/US2016/026342 filed Apr. 7, 2016, the entire contents of which are hereby incorporated by reference; which claims priority to U.S. provisional patent application No. 62/143,951 that was filed Apr. 7, 2015, the entire contents of which are hereby incorporated by reference.

BACKGROUND

Extraterrestrial soils are of interest because emerging private industries related to space travel and mining, as well as increased government interest, is driving the rapid development of space-based technologies, including those related to three-dimensional (3D)-printing. Being able to fabricate new, and to repair damaged, equipment on these planetary bodies is a necessity due to the monetary, physical, and time restrictions associated with supporting these endeavors from afar. The National Aeronautics and Space Administration (NASA) recently launched a 3D printer to the International Space Station (ISS) to explore the 3D printing in a space environment. While the European Space Agency (ESA) recently completed a feasibility study to determine if an outpost fabricated from lunar soil could be 3D-printed on the moon. While the ESA was initially successful in illustrating that large format 3D-printing could create stable structures from Lunar-like materials in vacuum-like environment, their technique is restricted to large format fabrication.

SUMMARY

Ink compositions for fabricating objects from natural planetary regoliths, including both terrestrial and extraterrestrial regoliths, and objects fabricated from the ink compositions are provided. Also provided are methods, including 3D printing methods, for fabricating objects using the ink compositions.

One embodiment of an ink composition comprises: a natural regolith comprising a reducible metal oxide and non-reducible ceramics; a graded organic solvent system; and an elastomeric polymer binder.

One embodiment of a method of forming a three-dimensional object, comprises the steps of: forming an elastomeric three-dimensional object from the ink composition; and exposing the elastomeric three-dimensional object to a reducing gas comprising $H_2$ at a temperature and for a period of time sufficient to reduce the reducible metal oxide to its corresponding metal to form a three-dimensional object comprising a composite of the metal and the non-reducible ceramics.

One embodiment of a three-dimensional object formed using the ink composition comprises: a composite comprising a metal and a natural regolith; and an elastomeric polymer binder.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

DETAILED DESCRIPTION

Figure 1:
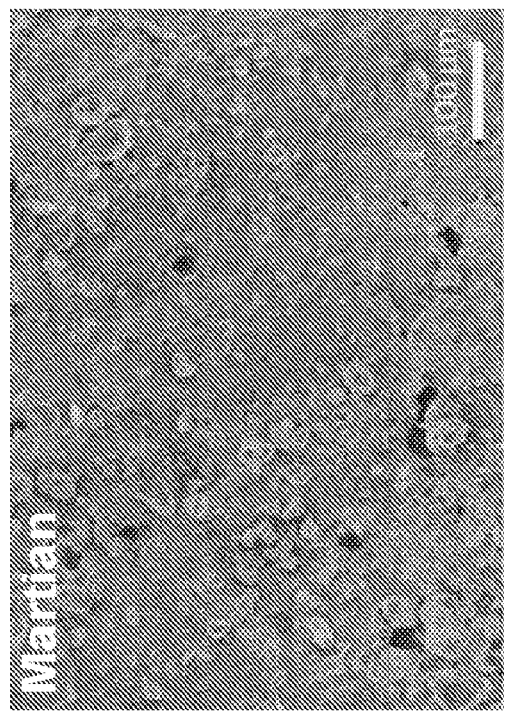
FIG. 1 SEM micrographs of 325 mesh sieved (Left) Lunar and (Right) Martian powders used for ink synthesis in the Example.
Figure 1:
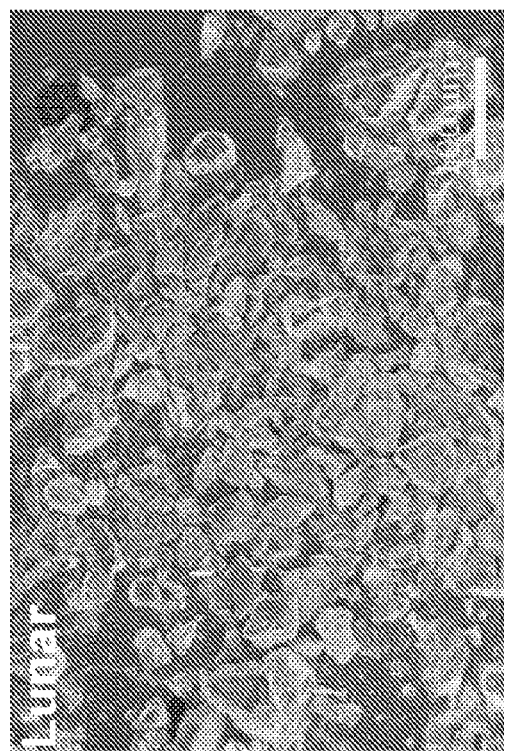

Ink compositions for fabricating objects from natural regoliths and objects fabricated from the ink compositions are provided. Also provided are methods, including 3D printing methods, for fabricating objects using the ink compositions.

The ink compositions and methods presented here can provide a highly practical and scalable means for fabricating user-defined objects from terrestrial and extraterrestrial regoliths, such as those found on lunar and planetary (e.g., Terrestrial Martian) surfaces. In some embodiments the objects are formed using extrusion processes, including 3D printing. The as-extruded objects are elastic—and in some embodiments hyperelastic. As such, they can be deformed and then spring back to their original shape and volume. These properties make the elastic objects useful for many applications, such as fabrication of flexible tubing/fittings and even biodegradable tires. Optionally, the fabricated objects can also be thermally processed in a reducing environment. This sinters together the particles from which the regolith is comprised and reduces at least some of the reducible metal oxides, such as iron oxides, that are present in the regoliths into their corresponding metals. This thermal treatment can be used to form a ceramic-metal composite that is both strong and stiff and also tough (i.e., more resistant to fracture than sintered ceramic comprising only pure (single-component) materials). In addition, the metal present in the composite can render the material magnetic.

One embodiment of an ink composition (which may be referred to as a "particle-laden ink" or, depending upon the consistency of the ink, a "paste") comprises: a natural regolith, such as an extraterrestrial regolith; a graded solvent system; and an elastomeric polymer binder. The natural regolith can make up a substantial portion of the ink composition. For example, in some embodiments, the ink compositions comprise at least about 50 vol. % of the natural regolith based on its solids content.

The natural regoliths in the ink compositions are a heterogeneous material comprising a mixture of naturally occurring solid rock and mineral particles, which can comprise a broad range of materials and combinations of different minerals. The regolith of Earth and, possibly, some other planetary bodies also comprise soils, which are composed of organic matter and other compounds that support plant growth. However, the regoliths of other planetary bodies do not include soils. In addition to rock and mineral powders, examples of materials that may be included in the regolith include coarse to fine sand, silt, clay, and smaller inorganic colloidal particulates. These types of natural particulates are highly ubiquitous on both Earth and extraterrestrial planetary bodies, such as Earth's moon and Mars. Many extraterrestrial regoliths will comprise high concentrations of silicon oxides and/or aluminum oxides with small concentrations of one or more reducible metal oxides, such as iron oxides. By way of illustration, some embodiments of the regoliths comprise about 30 to about 60 weight percent (wt. %) $SiO_2$, about 10 to about 30 wt. % $Al_2O_3$ and about 1 to about 20 wt. % iron oxides (i.e., FeO and/or $Fe_2O_3$). In addition the terrestrial regoliths will typically comprise a variety of other inorganic and organic particulate matter in smaller concentrations.

The regoliths will typically include both reducible metal-containing components, such as iron oxides, and non-reducible components, such as oxides and other ceramics. In many regoliths, the reducible components are a minority component present in concentrations of 50 wt. % or less, 20 wt. % or less or 10 wt. % or less. Generally, the non-reducible components will make of a majority of the regolith by weight. In some embodiments of the ink compositions it may be desirable to add additional quantities of reducible metal-containing components, such as metal oxides (e.g., iron oxides), in order to increase the final metal content in objects that have undergone thermal processing to form a metal-ceramic composite, as discussed in more detail below. These additional metal-containing components (which can be referred to as dopants) can be added in relatively small quantities or in large quantities. For example, the additional components can comprise from about 0.01 volume % to about 50 volume % (e.g., from about 1 volume % to about 20 volume %) of the total volume of the regoliths plus the added reducible metal-containing components.

The sizes of the natural particles in the regoliths will vary, but are generally small enough to be extruded through a print nozzle. Typically, the particles will have sizes of no greater than about 1 mm (or a φ classification of greater than 1 on the Krumbein Phi Scale). However, if the average particle size in a given regolith sample is too large for a given extrusion process (i.e., for a selected print nozzle) the regoliths can be sieved to reduce the particle size. Thus, in some embodiments of the ink compositions, the average particle size for the natural regolith particles is no greater than about 100 µm.

In addition to the natural regoliths, the ink compositions comprise an elastic polymer (elastomer) as a binder. The use of such binders promotes the robustness of objects, including films and coatings, formed from the ink compositions. In addition, when the ink compositions are extruded, the elastomeric binders can provide for the formation of extruded stands that are continuous, flexible and strong. As a result, the ink compositions enable precise 3D-printing of objects having extreme curvatures and allow extruded strands to be deposited over large, open gaps. This, in turn, enables 3D-printing of architectures with complex and unsupported features. Moreover, 3D-structures formed from the ink compositions can adopt, at least in part, the elastomeric properties of the elastic polymer binders. Thus, some embodiments of objects that are formed from the ink compositions have hyperelastic mechanical properties, which allow them to 'bounce back' to their original shape after undergoing loading (e.g., compression or tension).

The elastic polymers should be soluble or substantially soluble in the solvent system at the intended fabrication (e.g., printing) temperature, but are desirably insoluble or substantially insoluble in water at the intended fabrication temperature, or a higher temperature. Depending on the application of the objects that are to be formed from the ink compositions, the elastic polymer binders may be biodegradable and/or biocompatible elastic polymers. The elastic polymer may comprise, for example, a polyester, a polymethacrylate, a polyacrylate, a polyethylene glycol, or a combination of two or more thereof. In some embodiments, the polymeric binder is polycaprolactone (PCL). Other exemplary, suitable polymeric binders include poly lactic acid, poly glycolic acid, low density polyethylene, poly acrylic acid, poly methyl methacrylate and polylactic-co-glycolic acid (PLGA). Poly glycolic acid may also be referred to as poly glycolide and polylactic-co-glycolic acid may also be referred to as polylactide-co-glycolide. For extraterrestrial applications, the use of polymeric binders that can be derived from biological acids, which are common byproducts of biological activity (e.g., lactic acid and glycolic acid), may be advantageous because raw materials and resources may be scarce. This makes it possible to isolate a raw binder material from urine and other natural waste products. The raw materials for the elastic binders could also be derived from plants, such as vegetables.

The desired volume % of the regolith in the ink compositions may depend upon the size of the particles. With respect to the regolith, volume % refers to the ((volume of the regolith)/(volume of the regolith plus the volume of the polymeric binder plus any added non-reducible metal-containing components))*100, that is, the volume of the regolith as compared to the total volume of solids in the composition. In some embodiments of the ink compositions, the volume % of the regolith particles is up to 90%. This includes embodiments in which the volume % of regolith is in the range of about 50% to about 85%.

The desired volume % of the polymeric binding in the ink compositions generally depends upon the volume % of the regolith and is desirably sufficient to form a coating over the surface of the regolith particles. With respect to the binder, volume % refers to the ((volume of the polymeric binder)/(volume of the regolith plus the volume of the polymeric binder plus any added non-reducible metal-containing components))*100. In some embodiments, the volume % of the polymeric binder is about 15% or less. This includes embodiments in which the volume % of the polymeric binder is in the range of from about 15% to about 50%.

The ink compositions further comprise a solvent system comprising one or more solvents. For example, the solvent system may be a graded solvent. Some embodiments of the solvent system comprise dichloromethane (DCM), which may be used in combination with one or more additional organic solvents. The use of DCM is advantageous because, upon extrusion of the ink composition, DCM, which is a very high volatility solvent, evaporates very rapidly, leaving a solid, continuous fiber. The additional organic solvents desirably have vapor pressures that are lower than that of DCM at the desired printing or deposition temperature (e.g., room temperature—about 23° C.). As a result, the additional organic solvents evaporate more slowly over time, but permit adjacent layers to merge together during deposition, resulting in a single, monolithic structure with strong interlayer adhesion and fidelity. 2-butoxyethanol (2-Bu) and dibutylphthalate (DBP) are examples of additional organic solvents that may be included in the solvent system. In some ink compositions, DCM is a majority solvent in the solvent system. That is, it accounts for at least 50 volume % of the solvents in the solvent system. In some embodiments, DCM accounts for at least 70 volume % of the solvent system. This includes embodiments in which DCM accounts for at least 90 volume % of the solvent system.

The ink compositions can be made simply by mixing the solvents of the solvent system, the binder polymers and the regoliths and allowing the solvent to evaporate until the ink composition has achieved a viscosity suitable for deposition. Suitable viscosities will depend on the intended method of deposition and the deposition equipment. For example, if the ink composition is intended for use as a 3D printing ink, it should have a viscosity suitable for 3D-printing via extrusion through a print nozzle. Due to its simplicity, this ink composition formulation process is highly scalable. Quantities as small as, for example, a few mL or as large as, for example, many gallons or tons may be produced. The ink compositions are storage stable. For example, some embodiments of the ink compositions can be stored for a period of at least six months at room temperature without observable separation of the ink composition components and/or particle agglomeration.

The ink compositions can be used to form a variety of three-dimensional objects using a variety of deposition methods. The printing and other deposition methods can be carried out at, or near, room temperature and ambient pressure, but also in a low-gravity extraterrestrial environment. However, printing should generally be carried out at temperatures below the boiling points of the solvent system.

The ink compositions can be used to print objects using a 3D printer and layer-by-layer deposition. In one embodiment of a printing process, the ink composition is loaded into an ink cartridge of a 3D printer and extruded through the orifice in one or more print nozzles via pneumatic or mechanical pressure. Upon extrusion, solvents in the solvent system evaporate and a solid, continuous fiber is formed. Layer-by-layer deposition of such fibers can be used to form 3D-objects with overall architectures previously defined through computer aided design (CAD) drawings and internal architecture designed using 3D-printer specific software. The printed objects and the printed fibers from which they are formed can be composed of a single binder and/or regolith type. Alternatively, different portions of the object and different printed strands can be composed of different binders and/or regolith types. Such multi-materials objects can be 3D printed via multi-extrusion tool platforms, wherein different print heads and/or different nozzles contain different ink compositions.

For ink compositions comprised of non-water soluble elastic polymer binders and regolith particles, co-support printing can be used to make complex 3D objects with unsupported features. Such features include, for example, overhangs and covers (e.g., ceilings) over hollow cavities. In co-support printing, sacrificial support structures are printed and used as temporary substrates upon which the present ink compositions are printed. Once the object is formed with the sacrificial support structures in place, those structures can be selectively removed by submerging the object in water (or otherwise exposing it to water), leaving the non-water soluble portions of the object intact. Co-support printing is a technique that is well suited for the fabrication of complex objects, including objects with unsupported structures.

Other, non-extrusion-based methods for depositing the ink compositions include coating the ink compositions onto a substrate and allowing the solvents in the solvent system to evaporate. Suitable coating processes include painting an ink composition onto a substrate and coating a substrate with an ink composition via dip coating or spin coating. For example, the ink compositions can be used to create thin, particle-laden films via dip coating or can be used to coat existing bulk objects.

In addition, because the ink compositions may solidify almost immediately upon extrusion and bond to previously deposited layers, separately printed object parts—including object parts that are themselves printed using the present 3D ink compositions—can be fused together using the 3D ink compositions as a self-adhesive. In these applications, the ink compositions not only act as an adhesive, but also seamlessly meld the objects together at the location of deposition. As a result, extremely complex or very large 3D objects that could otherwise not be easily 3D printed directly can be created by seamlessly fusing parts together with the same ink composition that comprises the parts themselves.

The as-fabricated (e.g., as-printed) objects can be functional immediately after fabrication as soft and elastic objects. Such objects have a rubber-like consistency and may possess rubber-like mechanical properties. These objects are characterized by high flexibilities and are capable of undergoing significant deformation upon loading and returning to their original shape after unloading. As such, the as-fabricated objects may be structurally modified, e.g., by subsequent folding, rolling, bending, cutting, fusing and other deformation operations. This enables the formation of objects which are more complex than could be obtained by printing alone.

For some applications harder, more robust, non-elastic materials are desirable. Therefore, in some embodiments of the methods of fabricating objects from natural regoliths, the objects are subjected to a post-fabrication (e.g., a postprinting) heat treatment to convert metal-containing ceramics contained within the regoliths into their corresponding metals, while leaving non-reducing components of the regoliths (e.g., non-reducing metal oxides, other ceramics or organics) in their initial state. A "non-reducing component" or "non-reducible component" refers to a material that is not substantially reduced under conditions that reduce the metal-containing ceramics.) Thus, some embodiments of the methods include the steps of forming an initial object using a regolith-containing ink composition on a substrate and subsequently exposing the initial object to a reducing gas at a temperature and for a period of time sufficient to reduce and to sinter the reducible metal-containing ceramics (e.g., reducible metal oxide particles) in the regolith, whereby the initial object is converted into an object comprising a composite of one or more metals and one or more ceramics (e.g., oxides). In some embodiments of the methods, iron oxides present in the initial object (which may be referred to as a "green body") are reduced to produce iron in the final composite, while non-reducing silicon oxides and aluminum oxides are still present as ceramics in the composite. This method can be carried out using a 3D printer by extruding a terrestrial or extraterrestrial regolith-containing ink composition through a tip to deposit sequential layers of the ink composition on a substrate, whereby a three-dimensional green body object is formed on the substrate, and exposing the three-dimensional green body object to a reducing gas at a temperature and for a period of time sufficient to sinter at least some of the regolith particles and to reduce at least some of the reducible metal-containing ceramic particles in the ink, whereby a final three-dimensional object comprising a metal-ceramic composite is formed.

The composition of the reducing gas may be varied, depending upon the composition of the regolith. In some embodiments of the methods, the heat treatment and sintering is carried out in air. At sufficiently high temperatures and sufficient long treatment times, this can produce glass in the sintered sample. As discussed in detail in the Example below, it can be advantageous to use a reducing gas comprising or consisting of $H_2$ or comprising or consisting of $H_2$ mixed with an inert gas (e.g., Ar) in order to reduce or eliminate glass formation and facilitate reduction of the reducible components. Different percentages of the gases (e.g., $H_2$) in the gas mixture may be used (e.g., about 4% $H_2$); and different temperatures and periods of time may be used, each depending upon the composition of the ink and the desired properties of the final product. Periods of time for heat treatment may range, for example, from 2-48 hours, to several days, exceeding 50 hours. Temperatures used for the heat treatment may range from 900° C. to 1300° C., for example. This includes temperature in the range from 1000° C. to 1200° C.

Prior to reducing and sintering the extruded three-dimensional green body object, the object may be subjected to various other steps. For example, the green body object may be subjected to a temperature sufficient to remove at least some of the organic solvent and/or polymeric binder from the object (i.e., a debinding step).

Example

This example demonstrates that 3D printing methods can be applied to raw, natural powder mixtures. These are collectively referred to as "planetary regoliths", which encompass particulate materials like dirt, sand, soil, ash, etc. By any standard, these materials are not pure; they may be comprised of many types and phases of geologic minerals and even organic material. The chemistry, size, and morphology of the particulate materials are by no means regular. Although this example focuses primarily on Lunar and Martian simulant powders, the following methods could just as easily be applied to other "rough mixtures" including those related to concrete. Notably, the PLGA utilized in the majority of this work is derived from lactic and glycolic acids. These acids, commonly derived from plants and vegetation for the purpose of polymer fabrication, can also be isolated from urine. Thus, in some embodiments of the present methods, lactic and glycolic acids isolated from human urine can be utilized to synthesize PLGA for the purposes of particle-laden ink formulation and 3D-printing.

The extraterrestrial, particle-laden ink described here, combined with thermochemical processing, can be utilized to create custom tools or parts via 3D-printing. Although not as ideal as a pure, designer alloy, these natural systems can play a significant role in establishing and supporting highly remote operations.

Because powder-bed methods are not practical in low-gravity environments, other recently implemented methods have focused on direct-extrusion of heavy ceramic pastes followed by direct sintering, or energy-based directed laser deposition. The latter technique is not practical due to the poor quality of the sintering of rocky material that can be achieved with the currently available power sources. Direct extrusion, which does not require a concentrated power source, however, shows more promise. The disadvantage of direct extrusion for these types of materials, is that it is restricted to large format printing, due to the large concentration of particles which would other clog fine nozzles. The "direct ink write" (DIW) method presented here, however, does not suffer from this limitation, and could be applied to both small and large-scale structures. Additionally, it is demonstrated that the as-printed planetary regolith constructs display almost rubber-like mechanical properties (i.e. they are highly elastic). These 3D-printed "lunar rubbers", which are still comprised primarily of the hard, inorganic native material, may be a way of practically introducing soft-material manufacturing to remote extraterrestrial environments, which could be adapted for applications such as flexible tubing or tires.

Additionally, the planetary regoliths contain significant amounts of iron oxides, which can be reduced to iron and sintered in $H_2$ gas at elevated temperatures. Because pure, sintered ceramic objects, although strong and stiff, are exceptionally brittle compared with most materials, reduction and sintering protocols were utilized here to create what is essentially a 3D-printed ceramic-metal composite derived from natural powder materials. To this end, iron oxide enhanced (i.e., simulated extraterrestrial regoliths with iron oxide powder added) lunar inks were also created, 3D-printed, and thermochemically processed. The following is a description of the creation of these objects using the particle-laden ink method, as well as their characterization prior to and after direct sintering or thermochemical reduction with sintering.

Materials, Methods, and Results

Due to the difficulty in acquiring sufficient amounts of extraterrestrial regoliths for use in this example, simulant powders were utilized. These simulant powders, purchased from Orbital Technologies Incorporated, simulate, both in composition and general particle morphology, the particulate materials that comprise the lunar and Martian surfaces. Lunar dust simulant (JSC-1AF) was obtained from volcanic regolith on the West coast of the United States, while the Martian dust simulant (JSC Mars-1A) was obtained from volcanic regolith from the Hawaiian Islands. As can be seen in Table 1.1, these powders were comprised of a variety of oxide and other ceramic materials. In addition to the primary components listed below, these simulant powders also contained many more trace compounds which are not listed here. Both materials contain a significant concentration of iron oxides (20 wt. % in the case of the lunar powder), which can be reduced to iron through thermochemical processing. As received, these powders contained nanometer to multi-mm sized particles. Prior to incorporation into ink compositions, the powders were sieved through a 325 mesh to obtain powder that was no larger than ~50 μm. The morphology of the sieved simulant powders is shown in FIG. 1. 70 and 80 vol. % inks were formulated with PLGA using the same particle-laden ink methods. 80 vol. % powder inks were synthesized as follows (note that volumes and masses are flexible as long as respective ratios are kept constant):

2.3 g (2 cm$^3$) PLG polymer granules dissolved in DCM (just enough DCM to dissolve the polymer, usually 10× more DCM than PLGA by mass) in a glass jar.

Separately, 28.24 g (8 cm$^3$) Lunar Simulant or 28.0 g (8 cm$^3$) Martian Simulant (8 cm$^3$, 27.76 g), were added to a solvent mixture containing 7.2 g 2-butoxyethanol, 3.6 g DBP, and excess DCM (DCM was added to a point such that the powders suspension was smooth and clumpy). This corresponded to 0.9 g EGBE and 0.45 g DBP for every 1 cm$^3$ powder used.

Lunar simulant with added oxide (Lunar+Fe$_2$O$_3$) ink compositions were synthesized using a similar process. The lunar powder was supplemented with 1-5 μm Fe$_2$O$_3$ powder (Sigma Aldrich), such that total vol. % of iron oxides in the final powder was approximately 20%. Since the initial iron oxide vol. % in the lunar simulant powder was ~4%, 16 vol. % Fe$_2$O$_3$ powder was added. This corresponded to a mass ratio of 2.7:1 Lunar:Fe$_2$O$_3$.

The powder suspension was then added to the PLG dissolved in DCM. This "pre-ink" was then physically stirred until homogeneous and left open under a fume hood while being physically agitated via sonication and occasional mixing by hand. This was done until a viscosity of 20-25 Pa*s had been achieved (as determined by a viscometer). Some of this ink composition was then loaded in a plastic cartridge compatible with a 3D-Bioplotter (EnvisionTEC, GmbH), while the rest of the ink composition was stored in a sealed glass jar at 4° C.

Figure 2:
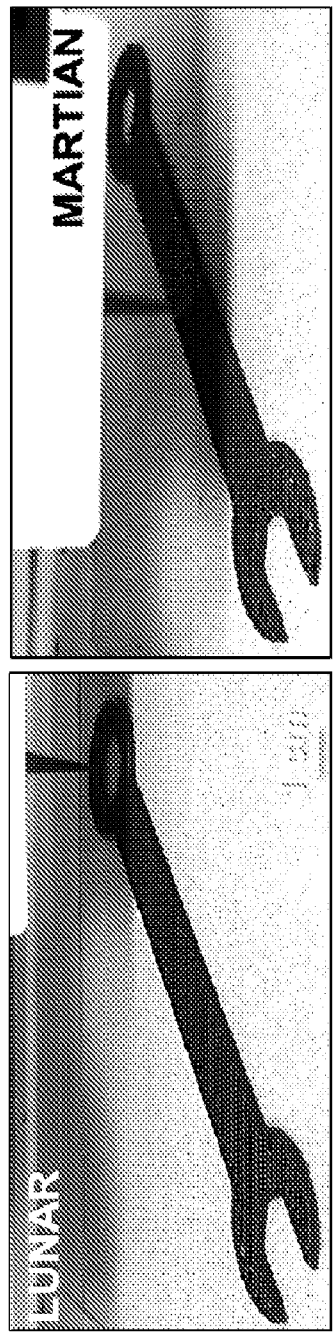
FIG. 2 Photographs of 80 vol. % (Lunar) Left and (Right) Martian inks being 3D-printed into 12 cm-long wrenches using a 600 μm-diameter tip and employing a "fiber stretching" technique via print speeds exceeding 70 mm/s.

The ink composition was then 3D-printed into various shapes and objects, previously defined through CAD software, using 0.4-1.5 Bar application pressure (for extrusion) from a 400-1000 μm diameter tip. Extrusion pressure and tip diameter are inversely proportional. Linear printing speeds were between 60 and 80 mm/s. In this manner, objects such as 10 cm-long, 12-layer-thick wrenches (FIG. 2), and additional structures (FIG. 3) could be printed. The microstructure of these as-printed, green body structures is shown in FIG. 2. Powder particles were observed to be bound together through a PLG matrix.

TABLE 1.1

Composition of Lunar and Martian dust simulants by weight % as presented by Orbital Technologies. Weighted density is given below the tables.

| Lunar Dust Simulant Composition | | Martian Dust Simulant Composition | |
| --- | --- | --- | --- |
| Compound | Weight % | Compound | Weight % |
| SiO$_2$ | 46 | SiO$_2$ | 40 |
| Al$_2$O$_3$ | 15.75 | Al$_2$O$_3$ | 22 |
| Fe$_2$O$_3$ | 12.2 | Fe$_2$O$_3$ | 11 |
| FeO | 8.17 | FeO | 3 |
| TiO$_2$ | 1.7 | TiO$_2$ | 3.5 |
| CaO | 9.9 | CaO | 5.5 |
| Na$_2$O | 2.8 | Na$_2$O | 2 |

$\rho_{Lunar}$ = 3.53 g/cm$^3$
$\rho_{Martian}$ = 3.50 g/cm$^3$

The mineral phases present in the as-received lunar regolith were as follows: Plagioclase: 50% SiO$_2$—32% Al$_2$O$_3$—14% CaO; Glass: 46% SiO$_2$—3% TiO$_2$—15% Al$_2$O$_3$—13% FeO*—5% MgO—10% CaO—4% NaO; Ca-pyroxene: 47% SiO$_2$—3% TiO$_2$—6% Al$_2$O$_3$—10% FeO*—12% MgO—20% CaO; Olivine: 38% SiO$_2$—23% FeO*—36% MgO—1% CaO; Titanomagnetite: 2% SiO$_2$—14% TiO$_2$—6% Al$_2$O$_3$—65% FeO*—5% MgO→magnetic mineral. The notation FeO* is total Fe calculated as FeO. Due to the fine grain size, some contribution has been observed from the surrounding matrix for olivine and Ca-pyroxene.

Ink Synthesis and Characterization

As described above, 70 and 80 vol. % Lunar and Martian inks were synthesized using lunar and Martian simulant powders that had been sieved to 325 mesh or smaller (~50 μm and smaller). (More specifically, Mars=JSC MARS-1A SIMULANT; and Lunar=JSC-1A lunar simulant.) Both lunar and Martian powders were highly irregular in morphology, with the lunar powders generally being more jagged and sharp than the Martian (FIG. 1). In addition, to the inks derived from the pure simulant powders, an additional 80 vol. % iron oxide enhanced lunar ink was fabricated through addition of Fe$_2$O$_3$ powder (1-5 μm, Sigma) such that the final volumetric composition of the powder component of these inks was 20 vol. %. Using a viscometer, the low shear-rate viscosity of the inks immediately prior to printing were determined to be 20-25 Pa·s.

3D-Printed Lunar and Martian Microstructures 70 and 80 vol. % Lunar, iron oxide enhanced Lunar, and Martian inks were 3D-printed into a variety of architectures using a 3D-Bioplotter (EnvisionTEC GmbH), including 2 cm-diameter 2 cm-tall cylinders for mechanical testing, as well as 12 cm-long wrenches (FIG. 2) and additional shapes. Due to the relatively large particles comprising these inks, they could not be effectively 3D-printed using tips smaller 400 μm diameter. Typically, a 600 μm-diameter tip was utilized in combination with the advanced "fiber stretching" 3D-printing technique to produce objects comprised of 400 μm diameter fibers.

Figure 3:
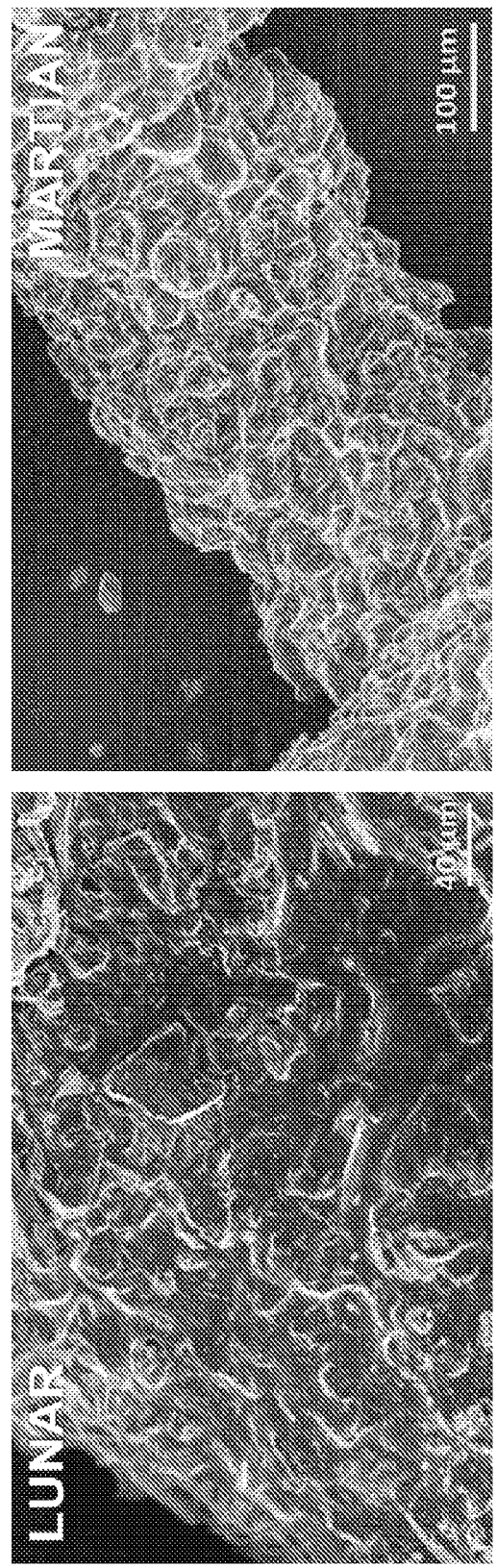
FIG. 3 SEM micrographs of 80 vol. % 3D-printed (Left) Lunar and (Right) Martian microstructures.

SEM of as-printed 80 vol. % constructs revealed there was no obvious surface porosity within the material (FIG. 3).

Direct Sintering in Air v. Thermochemical Reduction and Sintering in Hydrogen

Figure 4:
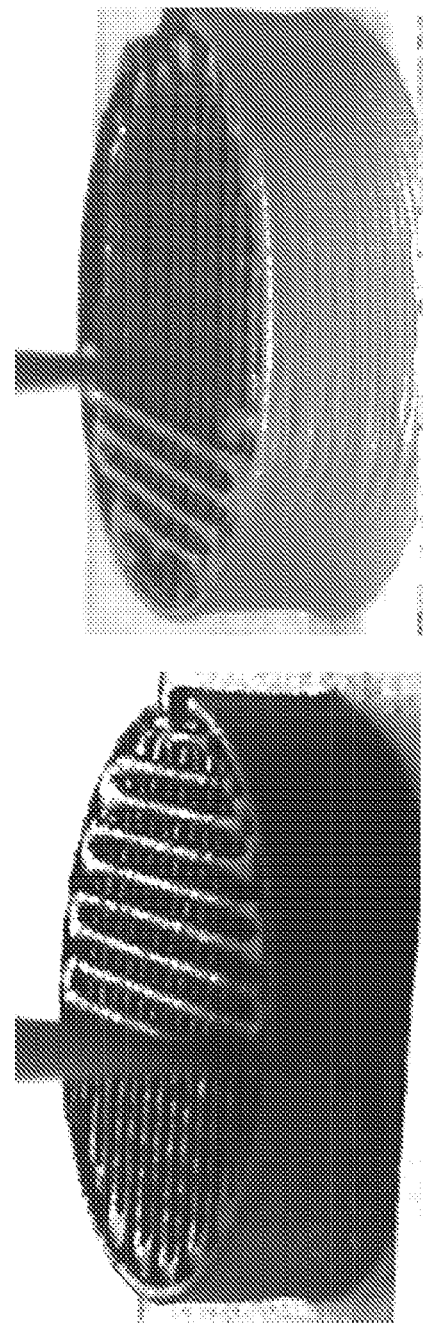
FIG. 4 Photographs of 80 vol. % (Left) lunar and (Right) iron oxide enhanced lunar being 3D-printed using a 600 μm tip while utilizing a fiber stretch technique (which is difficult to show in static images).
Figure 5:
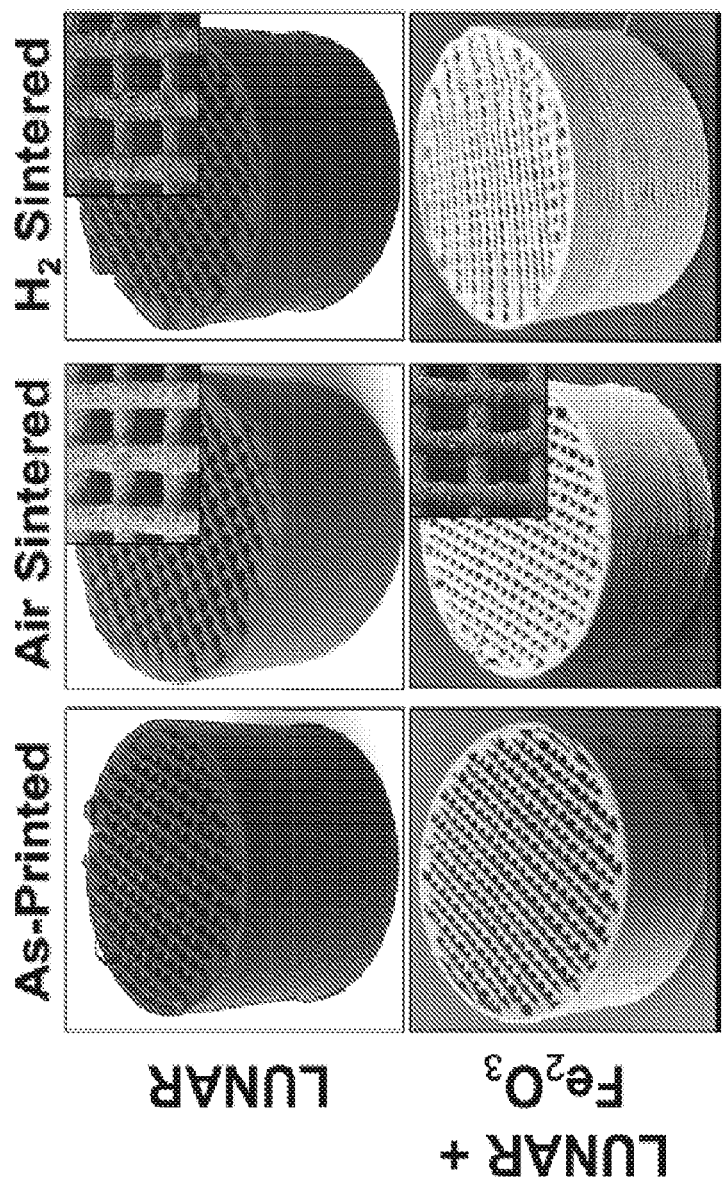
FIG. 5 Images of 80 vol. % 3D-printed lunar and iron oxide enhanced lunar cylinders: (Left) before sintering, (Center) after being sintered in air at 1060° C. for 50 hours, and (Right) after being thermochemically sintered in $H_2$ at 1060° C. for 4 hours. Insets show close up images of structures. As-printed cylinders were 2 cm-diameter and 2 cm-tall, which equates to being comprised of fifty 400 μm-thick layers. Each cylinder took approximately 4 minutes to create via 3D-printing.

To demonstrate that thermochemical reduction and sintering H$_2$ has advantageous over direct thermal sintering, which is the established method for processing these types of natural materials into solid ceramics, reduction and sintering in air was applied to the printed lunar and Martian objects. 80 vol. % lunar and Martian cylinders (2 cm-diameter×2-cm tall→50 layers), as well as iron oxide enhanced lunar cylinders (FIG. 4), were sintered in air for 50 hours at 1060° C. or in pure H$_2$ for 4 hours at 1060° C. Although Martian cylinders survived sintering in air, they did not survive thermochemical processing in H$_2$. The data below primarily focuses on the lunar materials. FIG. 5 shows the lunar and iron oxide enhanced lunar cylinders as-printed, after being sintered in air, and after being sintered in H$_2$. Notably, the only components of these materials that are reducible in H$_2$ are the iron oxides. The lunar based objects processed in air underwent minimal linear dimension reduction (2-4%), while the lunar objects processed via H$_2$ reduction and sintering underwent ~10% linear dimension reduction. The thermally processed lunar objects maintained all original as-printed details. The distinct difference in color of air and H$_2$ sintered objects for both lunar systems is indicative of a significant compositional difference and demonstrates that the iron oxide components did in fact reduce to iron in the H$_2$ processed samples.

Figure 6:
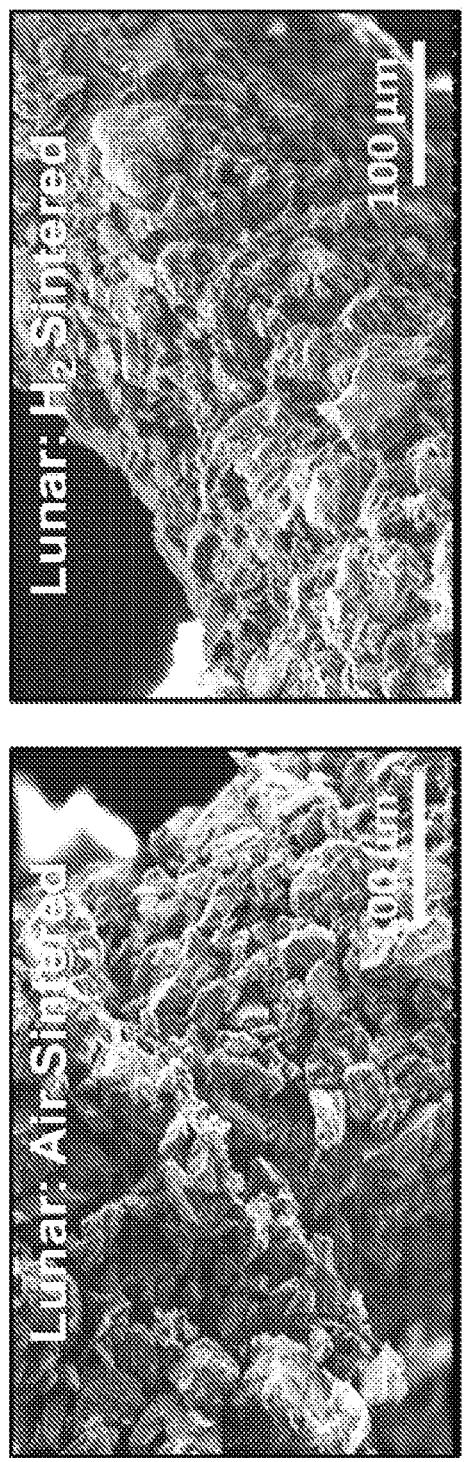
FIG. 6 SEM micrographs of Lunar samples after being sintered in air or $H_2$.
Figure 7:
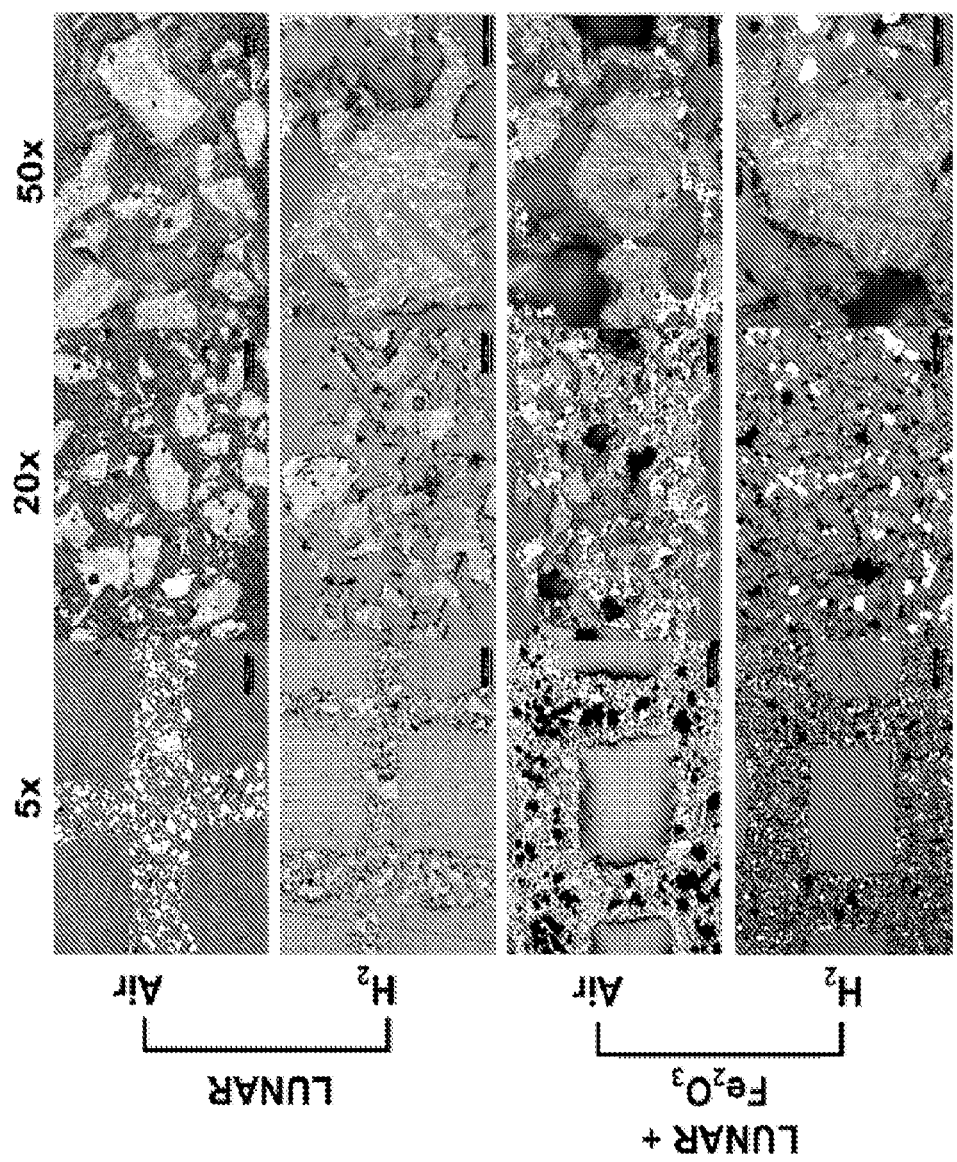
FIG. 7 Metallographic optical photographs at multiple magnifications of polished sections of cylinders shown previously in FIG. 5. Large black regions represent points of particle pull out. Smooth white/reflective regions represent iron metal that was derived from reduced iron oxides.

SEM imaging of the lunar samples that had undergone sintering in air or H$_2$, shown in FIG. 6 reveals that neither system was fully sintered, which was expected based on the high silica and alumina content of these materials and the relatively low sintering temperatures utilized. From a composition perspective, simple SEM imaging does not reveal compositional information. Metallographic processing and imaging of the samples (FIG. 7) reveals that there were distinct microstructural and compositional differences between the samples. Of significant note are the isolated regions of bright white/reflective material that was present only in the $H_2$ sintered samples, which are believed to be isolated regions of iron derived from reduced iron oxides. A peak associated with BCC iron in the x-ray diffraction of post-compression testing of the material validates that there was in fact a significant amount of iron in the $H_2$ processed samples, which was not present in the air sintered samples.

Figure 8:
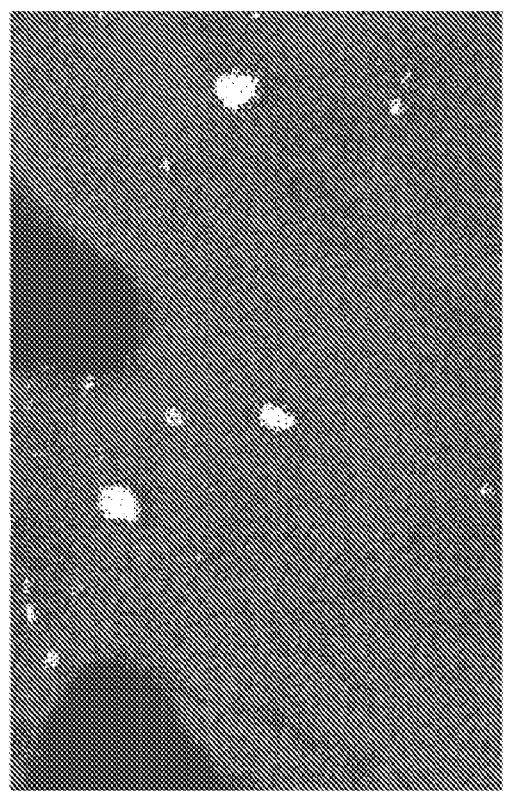
FIG. 8 Elemental map obtained via SEM energy dispersive spectroscopy of $H_2$ processed iron oxide enhanced lunar cylinder. Image is approximately 10 μm across.

Although present in measurable quantities, the iron in both the lunar and iron oxide enhanced lunar samples that had been processed in $H_2$ does not form a percolating network that would be required to mechanically toughen the majority ceramic matrix. This is illustrated in the elemental map below (FIG. 8) from an iron oxide enhanced lunar sample that had undergone $H_2$ thermal processing.

Mechanical Properties

Figure 9:
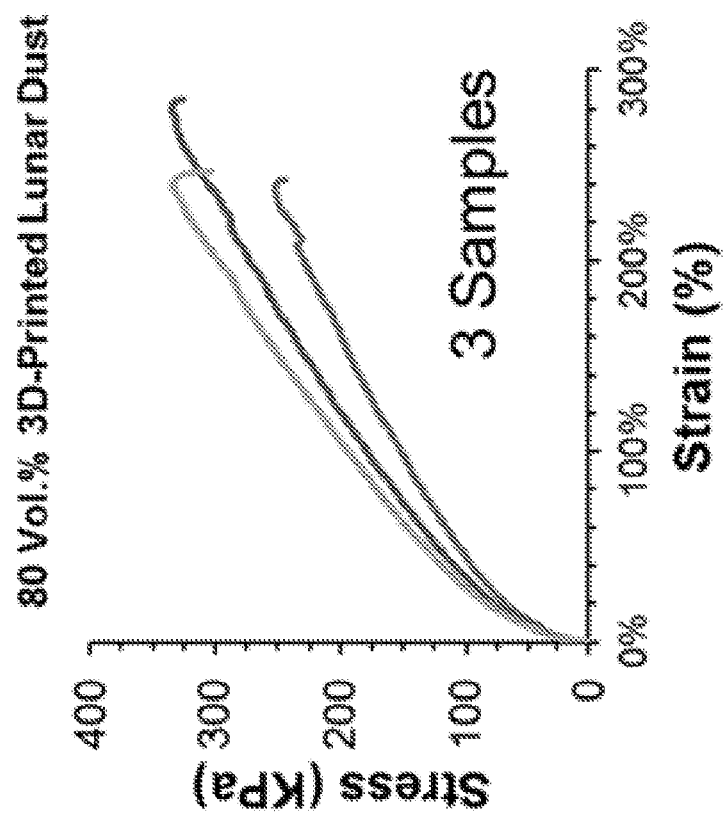
FIG. 9 Tensile profile for 80 vol. % lunar specimens.
Figure 10:
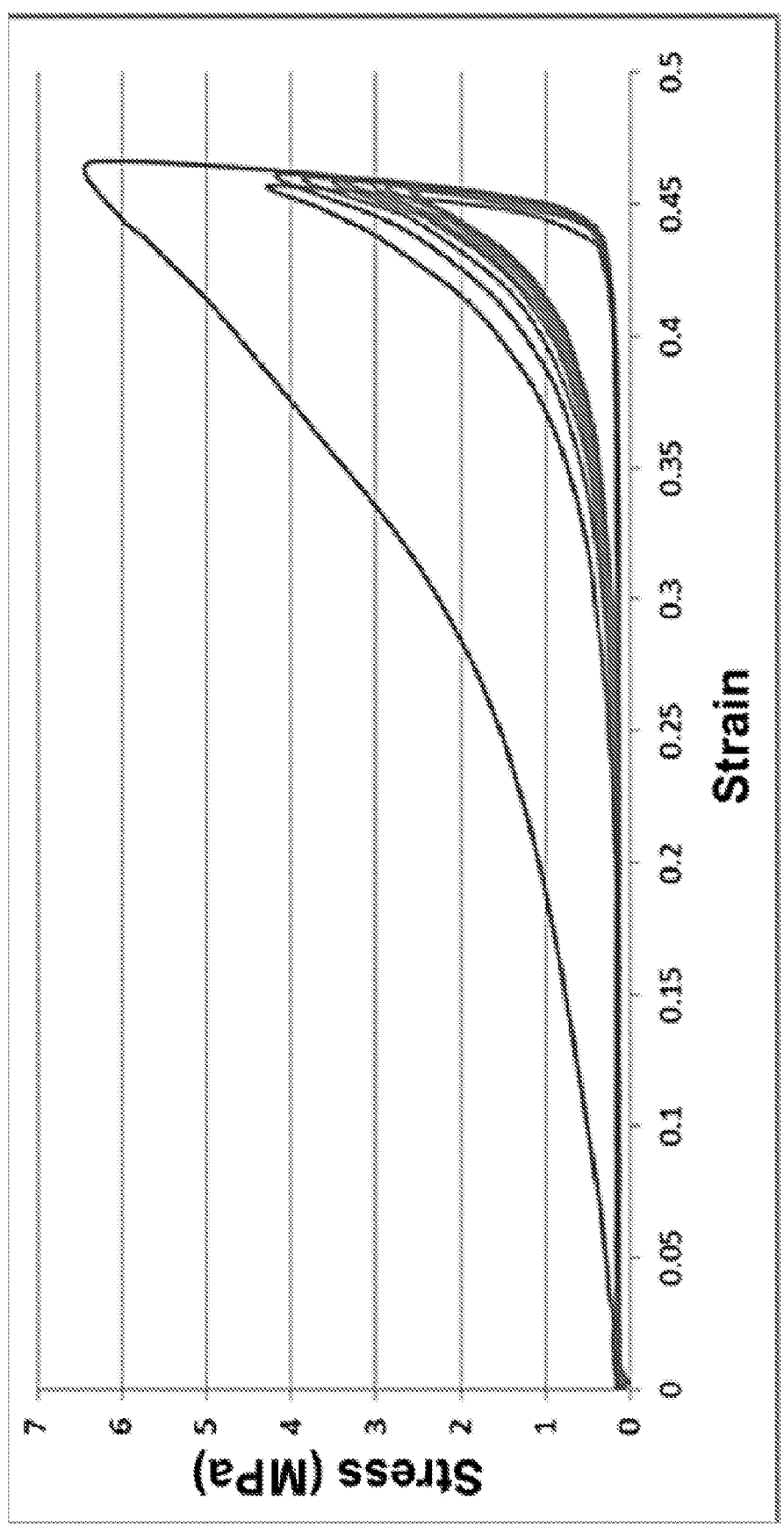
FIG. 10 Cyclic compression profile for 75% porous 90° lunar cylinder (1 cm-diameter, 1 cm-tall).
Figure 11:
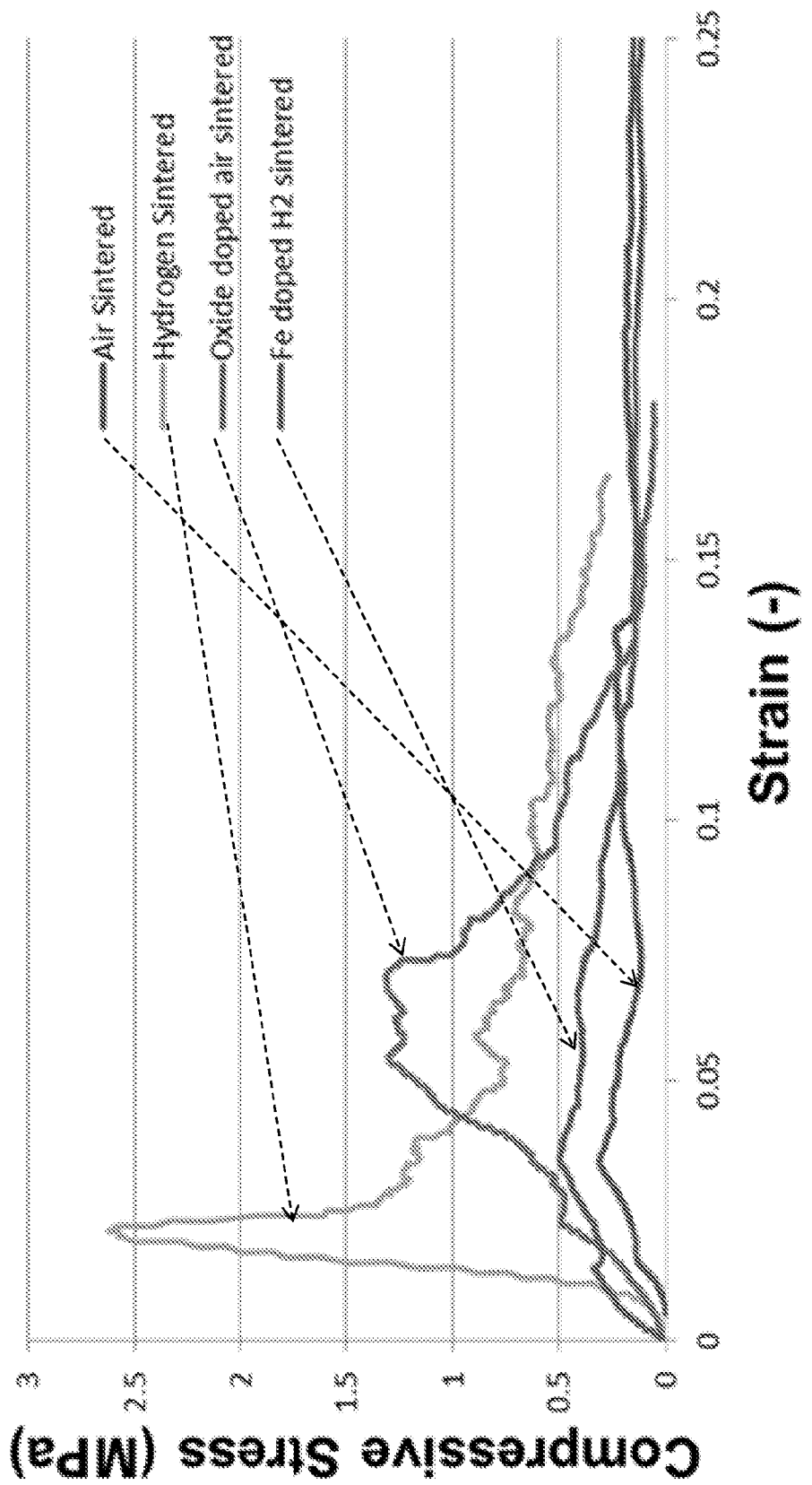
FIG. 11 Compression profiles of thermally processed cylinders shown in FIG. 5.

Although comprised of 80 vol. % ceramic powder and only 20 vol. % elastomer (PLGA), 3D-printed lunar materials' mechanical properties were dominated by the elastomer binder. Under tension, as-printed 80 vol. % lunar specimens can be strained upwards of 250% (FIG. 9). Compression profiles were also obtained for the cylindrical samples. (FIG. 10 and FIG. 11). Finally, direct compressive mechanical testing of the air and $H_2$ sintered specimens revealed what was originally hypothesized: 4 hour $H_2$ sintered lunar samples were both stronger and tougher than their 50 hour air sintered counterparts. However, samples that contained added iron oxide and were $H_2$ processed did not display an improvement in mechanical properties. There are several possible reasons for this. First, the extra iron, which has been shown not to form a percolating network, simply forms larger metallic aggregates than the lunar samples with the added iron. Due to the smaller size of the aggregates in the base lunar $H_2$ sintered sample, toughness and strength is enhanced, in similar manner to dispersoid strengthening. However, metal aggregates are too large in the iron-added samples to have this beneficial effect. Instead, they disrupt sintering between non-reducible oxide particles.

Magnetic and Electrical Properties

Various material samples, including raw powders, green body objects, and objects sintered in air and $H_2$ were tested for magnetism using an Nd—Fe—B magnet. Although not quantified, there was a distinct difference in the magnetic properties between the $H_2$ sintered and air sintered lunar samples, as shown in Table 2. In the table, 'yes' indicates the magnet was able to pick up the sample; 'weak' means the magnet was able to move, but not pick up, the sample; and 'no' means the sample showed no response to the magnet. $H_2$ sintered lunar cylinders were obviously magnetic, while air sintered lunar cylinders, were not. This is a potentially beneficial property that can be utilized for automated transport and manipulation these objects. Rather than having to firmly, physically grasp the lunar objects, which are still quite brittle, electro-magnets could be used to hold, move, and secure them. Neither of the types of lunar samples, however, were electrically conductive, further indicating that the iron within the $H_2$ sintered samples was not percolating.

| Atmosphere | Temperature (° C.) | Time (Hrs.) | Magnetic? |
|---|---|---|---|
| ~325 mesh powder | n/a | n/a | Yes |
| Green Bodies | n/a | n/a | Yes |
| Air | 1050 | 4 | Very Weak |
| Air | 1100 | 4 | Weak |
| Air | 1100 | 24 | No* |
| Air | 1110 | 4 | Yes** |
| Hydrogen | 1050 | 4 | Yes |
| Hydrogen | 1100 | 4 | Yes |
| Hydrogen | 1100 | 24 | Yes |

*A small amount of glass formed during the heat treatment. The 3D microarchitecture was maintained.
**Glass formed during the heat treatment. The 3D architecture was not maintained.

Mineral phases that may be present in the various samples include: titanomagnetite/titanoferous magnetite ($Fe_2TiO_4$ or $TiFe^{2+}_2O_4$)=magnetic; iron (Fe)=magnetic; wustite (FeO)=non-magnetic; hematite ($Fe_2O_3$)=magnetic; magnetite ($Fe_3O_4$)=magnetic.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An ink composition comprising:
   a planetary regolith comprising a reducible metal oxide and non-reducible ceramics;
   a graded organic solvent system; and
   an elastomeric polymer binder.

2. The ink composition of claim 1, wherein the planetary regolith is a naturally occurring terrestrial regolith.

3. The ink composition of claim 1, wherein the planetary regolith is a naturally occurring extraterrestrial regolith.

4. The ink composition of claim 1, wherein the reducible metal oxide comprises iron oxide.

5. The ink composition of claim 1, wherein the non-reducible ceramics comprise $SiO_2$ and $Al_2O_3$.

6. The ink composition of claim 4, wherein the non-reducible ceramics comprise $SiO_2$ and $Al_2O_3$.

7. The ink composition of claim 6, wherein the $SiO_2$ and $Al_2O_3$ comprise at least 50 wt. % of the total weight of the reducible metal oxides and non-reducible ceramics in the planetary regolith.

8. A method of forming a three-dimensional object, the method comprising:
   (a) forming an elastomeric three-dimensional object from an ink composition comprising:
      a planetary regolith comprising a reducible metal oxide and non-reducible ceramics;
      a graded organic solvent system; and
      an elastomeric polymer binder; and (b) exposing the elastomeric three-dimensional object to a reducing gas at a temperature and for a period of time sufficient to reduce the reducible metal oxide to its corresponding metal to form a three-dimensional object comprising a composite comprising the metal and the non-reducible ceramics.

9. The method of claim 8, wherein the reducing gas comprises $H_2$.

10. The method of claim 8, wherein the temperature is in the range from 900° C. to 1300° C. and the time is in the range from 2 to 48 hours.

11. The method of claim 8, further comprising adding an additional quantity of a reducible metal oxide to the ink composition prior to using it to form the elastomeric three-dimensional object.

12. The method of claim 8, wherein forming an elastomeric three-dimensional object from the ink composition comprises 3D printing the ink composition.

13. The method of claim 8, wherein the planetary regolith is a naturally occurring terrestrial regolith.

14. The method of claim 8, wherein the planetary regolith is a naturally occurring extraterrestrial regolith.

15. The method of claim 8, wherein the reducible metal oxide comprises iron oxide and its corresponding metal is iron.

16. The method of claim 8, wherein the non-reducible ceramics comprise $SiO_2$ and $Al_2O_3$.

17. The method of claim 15, wherein the non-reducible ceramics comprise $SiO_2$ and $Al_2O_3$.

18. The method of claim 17, wherein the $SiO_2$ and $Al_2O_3$ comprise at least 50 wt. % of the total weight of the reducible metal oxides and non-reducible ceramics in the planetary regolith.

19. A three-dimensional object comprising:
a composite comprising a metal and a planetary regolith; and
an elastomeric polymer binder.

20. The object of claim 19, wherein the planetary regolith is a naturally occurring extraterrestrial regolith.

* * * * *